(12) United States Patent
Shabtai et al.

(10) Patent No.: US 10,192,057 B2
(45) Date of Patent: Jan. 29, 2019

(54) MISUSEABILITY ANALYSIS FOR IT INFRASTRUCTURE

(71) Applicant: B. G. Negev Technologies and Applications Ltd., at Ben-Gurion University, Beer Sheva (IL)

(72) Inventors: Asaf Shabtai, Hulda (IL); Yuval Elovici, D.N. Lachish (IL)

(73) Assignee: B. G. NEGEV TECHNOLOGIES AND APPLICATIONS LTD., AT BEN-GURION UNIVERSITY, Beer Sheva (IL)

( * ) Notice: Subject to any disclaimer, the term of this patent is extended or adjusted under 35 U.S.C. 154(b) by 0 days.

(21) Appl. No.: 15/328,683

(22) PCT Filed: Jul. 27, 2015

(86) PCT No.: PCT/IL2015/050769
§ 371 (c)(1),
(2) Date: Jan. 24, 2017

(87) PCT Pub. No.: WO2016/016885
PCT Pub. Date: Feb. 4, 2016

(65) Prior Publication Data
US 2017/0213038 A1 Jul. 27, 2017

Related U.S. Application Data

(60) Provisional application No. 62/029,576, filed on Jul. 28, 2014.

(51) Int. Cl.
*H04L 29/06* (2006.01)
*G06F 21/57* (2013.01)
(Continued)

(52) U.S. Cl.
CPC ............ *G06F 21/577* (2013.01); *G06F 21/00* (2013.01); *G06Q 10/0635* (2013.01);
(Continued)

(58) Field of Classification Search
CPC .. G06F 21/00; G06F 21/577; G06F 2221/034; G06Q 10/0635; H04L 63/1433; H04W 12/12; H04W 4/70
See application file for complete search history.

(56) References Cited

U.S. PATENT DOCUMENTS

2002/0147803 A1 10/2002 Dodd et al.
2004/0083389 A1 4/2004 Yoshida
(Continued)

OTHER PUBLICATIONS

Harel et al.; "M-score: A misuseability weight measure", IEEE Trans. on Dependable and Secure Computing, 9(3), 2012, 414-428 (15 pages).
(Continued)

*Primary Examiner* — Mohammad A Siddiqi
(74) *Attorney, Agent, or Firm* — Roach Brown McCarthy & Gruber, P.C.; Kevin D. McCarthy

(57) ABSTRACT

The present invention relates to a method and a framework that automatically and dynamically derives a misuseability score for every IT component (e.g., PC, laptop, server, router, smartphone, and user or any other element that can be connected to organization network or to the internet). The dynamic framework of the present invention supports the risk analysis process. The misuseability score encapsulates the potential damage that can be caused to the organization in case that an asset is compromised and misused, for example, as part of a cyber-attack.

11 Claims, 2 Drawing Sheets

(51) Int. Cl.
G06Q 10/06 (2012.01)
G06F 21/00 (2013.01)
H04W 12/12 (2009.01)
H04W 4/70 (2018.01)

(52) U.S. Cl.
CPC ......... H04L 63/1433 (2013.01); H04W 12/12 (2013.01); *G06F 2221/034* (2013.01); *H04W 4/70* (2018.02)

(56) References Cited

U.S. PATENT DOCUMENTS

| | | | | |
|---|---|---|---|---|
| 2010/0125912 | A1* | 5/2010 | Greenshpon | G06F 21/577 726/25 |
| 2010/0281543 | A1 | 11/2010 | Golomb et al. | |
| 2013/0031634 | A1 | 1/2013 | McClure et al. | |
| 2014/0173739 | A1* | 6/2014 | Ahuja | G06F 21/577 726/25 |

OTHER PUBLICATIONS

Vartanian et al.; "TM-Score: A Misuseability Weight Measure for Textual Content", IEEE Trans. on Information Forensics and Security, 9(12), 2014, 2205-2219 (15 pages).

International Search Report from a foreign patent office (Israeli Patent Office) in a counterpart foreign application (PCT Int'l application No. PCT/ IL2015/050769), dated Nov. 29, 2015 (3 pages).

Written Opinion of the International Searching Authority from a foreign patent office (Israeli Patent Office) in a munterpart foreign application (PCT Int'l application No. PCT/ IL2015/050769), dated Nov. 29, 2015 (5 pages).

* cited by examiner

MISUSEABILITY ANALYSIS FOR IT INFRASTRUCTURE

FIELD OF THE INVENTION

The invention relates to the field of data security. More specifically the invention relates to misuseability analysis for IT infrastructure.

BACKGROUND OF THE INVENTION

Today, organizations are facing many cyber-attacks which make the detection of cyber-attacks a very difficult task. In addition, the organizations have limited resources that can be allocated to the detection of complex cyber-attacks. Some of the challenges are: the need to analyze massive amount of data that is collected from the information technology (IT) infrastructure; the highly advanced attacks that are in continuously becoming more and more sophisticated; the fact that attacks can be originated by an insider or by an external entity; the rapid introduction of new technologies that are integrated into the organization's infrastructure; and the variety and costs of security solutions.

Because of these challenges organizations must conduct a thorough risk analysis process in order to focus their efforts and resources on the protection of the highly critical assets. In the risk analysis process the organization identifies the most important assets by estimating the risk to the asset which is a function of the asset's value and the likelihood of the threat to be realized. This process is time consuming and therefore ignores the dynamic nature of the IT infrastructure. This means that the value of assets may change over time and will not be reflected by the risk analysis process results.

Harel et al. [Harel, A., Shabtai, A., Rokach, L., and Elovici, Y., 2012. M-score: A misuseability weight measure. IEEE Trans. on Dependable and Secure Computing, 9 (3), 2012, 414-428] initially addressed this challenge and presented a new concept, Misuseability Weight, which assigns a sensitivity score to data, thereby estimating the level of harm that might be inflicted upon the organization when the data is leaked. Assigning a misuseability weight to a given dataset is strongly related to the way the data is presented (e.g., tabular data, structured or free text) and is domain-specific. Harel et al. [Harel, A., Shabtai, A., Rokach, L., and Elovici, Y., 2012. M-score: A misuseability weight measure. IEEE Trans. on Dependable and Secure Computing, 9 (3), 2012, 414-428] focus on mitigating leakage or misuse incidents of data stored in databases (i.e., tabular data) and presented the M-Score, a misuseability weight measure for tabular data.

Vartanian and Shabtai [Shabtai, A., Vartanian, A., 2014. TM-Score: A Misuseability Weight Measure for Textual Content", submitted to IEEE Trans. on Information Forensics and Security] proposes an extension to the misuseability weight concept and specifically focused on textual content. The main goal in Vartanian and Shabtai is to define a misuseability measure, termed TM-Score, for textual content. Using this measure it is possible to estimate the extent of damage that can be caused by an insider that is continuously and gradually exposed to documents. The extent of damage is determined by the amount, type and quality of information to which the insider is exposed. However, there are other IT elements that may be vulnerable and sensitive, except from insiders, such as servers and routers which are affected from different parameters (not necessarily the information to which an element is exposed to) which the prior art does not deal with.

Moreover, the necessity for a full and comprehensive framework that is able to derive a misuseability score for each IT element is rising in order to cope with the challenges of data security in the world of cyber-attacks.

One of the solutions to data security is given by data protection companies, which meets the employees of the organization, learn the roles of each employee and the work that is done by each employee, and then analyze the misuseability of each IT element. However, this solution depends on humans, it takes time and if there is a change in the organization such as a new IT element or a new job, the analysis has to be redone by the analyzer of the data protection company.

It is therefore an object of the present invention to provide a method and a framework that automatically and dynamically derives a misuseability score for every IT component, for supporting the risk analysis process.

Further objects and advantages of this invention will appear as the description proceeds.

SUMMARY OF THE INVENTION

The present invention relates to a method for automatically and dynamically deriving a misuseability score for one or more IT element(s), comprising the steps of: collecting data about said one or more IT element(s); analyzing said collected data; deriving from said analyzed data a misuseability score for said one or more IT element; analyzing the connections between said one or more IT elements; and grouping together IT elements with high connection and deriving a misuseability score to said group.

In an embodiment of the invention, an IT element is: a PC, laptop, server, router, smartphone, or user.

In an embodiment of the invention, an IT element is an element which is connected to an organization network and/or to the internet.

In an embodiment of the invention, the misuseability score is derived according to:

$$MScore(e, c) = \sum_{i=1}^{n} \alpha_i \cdot p_i$$

Wherein, $p_i$ are parameters that are dynamically computed from the data that is collected from the IT element $\alpha_i$ are constants which define the importance of each parameter;

Mscore(e,c) is the misuseability score;

c is the specific context for which the misuseability score is computed; and e is the IT element for which the misuseability score is calculated for.

In an embodiment of the invention, the misuseability score for a router is derived from the parameters of: configuration, purpose and activity.

In an embodiment of the invention, the misuseability score for a server is derived from the parameters of: configuration, server purpose and activity.

In an embodiment of the invention, the misuseability score for an end user device is derived from the parameters of: configuration, purpose and activity.

In an embodiment of the invention, the misuseability score for a user is derived from the type of services and machines that said user accesses as well as the type of data and information that the user is exposed to.

In an embodiment of the invention, the misuseability score for a user is derived from general behavioral patterns of the user.

In an embodiment of the invention, the connection between one or more element(s) is derived from the amount of traffic or activity between said one or more element(s) and from the rate of activity and connection between said one or element(s).

DETAILED DESCRIPTION OF THE
EMBODIMENTS OF THE INVENTION

The present invention relates to a method and a framework that automatically and dynamically derives a misuseability score for every IT component (e.g., PC, laptop, server, router, smartphone, and user or any other element that can be connected to organization network or to the internet). The dynamic framework of the present invention supports the risk analysis process. The misuseability score encapsulates the potential damage that can be caused to the organization in case that an asset is compromised and misused, for example, as part of a cyber-attack.

In the present invention the misuseability concept is extended to a full and comprehensive framework that is able to derive a misuseabilty score for each IT element including personal computers, servers, smartphones, databases, routers, switches and users. In addition the method of the present invention also recognize groups of IT element which are highly connected and thus, the method and the framework of the present invention derives a misuseability score for such groups.

In addition the present invention also derives misuseability score for IoT networks (Internet of Things). IoT is in fact the network of all the things and element that are connected to the internet and or to the organization network, for example: smart watch, air conditioning system and cars. The present invention derives a misuseability score to every element that is connected and which may be a destination for attacks.

Figure 1:
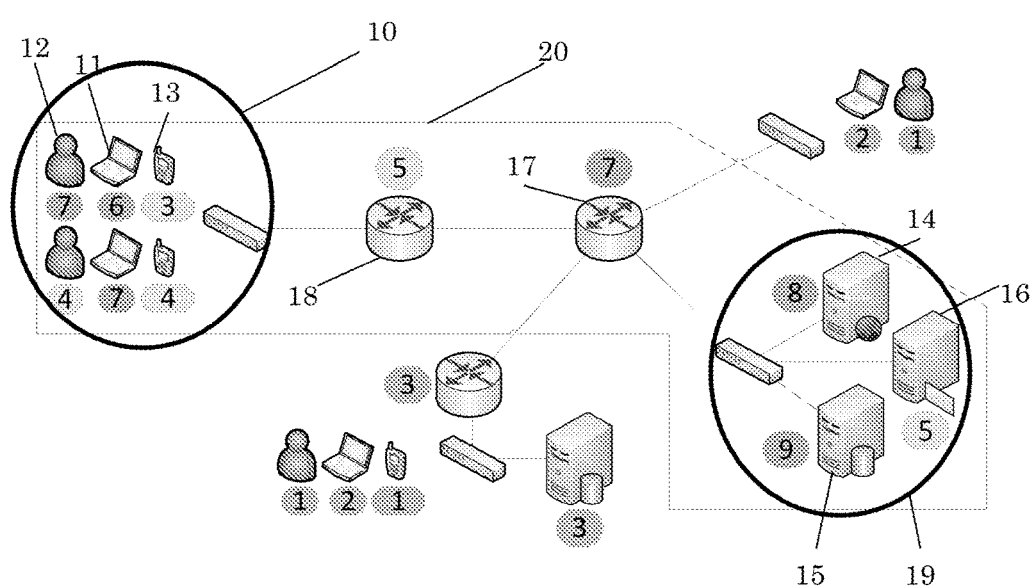
FIG. 1 schematically shows an example for the concept of the present invention.

FIG. 1 schematically shows an example of the concept of the present invention. For each IT element (e.g., PC, laptop, server, router, smartphone, and user), a misuseability score is derived. For example, in group 10, for laptop 11, a misuseability of 6 is derived, for user 12, a misuseability of 7 is derived and for smartphone 13, a misuseability of 3 is derived. In addition, in group 19, for server 14 a misuseability of 8 is derived, for server 15, a misuseability of 9 is derived and for server 16, a misuseability of 5 is derived. The routers 17 and 18 connects between the IT element of group 10 and 19. Router 17 has a misuseability score of 7 and router 18 has a misuseability score of 5. The framework of the present invention recognizes the high connection between groups 10 an 19 and therefore marks groups 10 and 19 as a community 20. The framework of the present invention also derives an aggregative misuseability score for the community 20, which is based on the misuseability of each one of the elements in the community. By analyzing the connectivity level among the elements it is possible to identify clusters of elements that are not only highly connected but also have a high misuseability score as a group and therefore should be carefully analyzed and protected.

The misuseability score is a quantitative measure that is calculated for each IT element based on data collected from the element itself (using a dedicated agent) and/or externally—from the network traffic. The collected data may be any data and/or information that affects the vulnerability of the IT element, for example, the location of the IT element and the functionality of the IT element. The type of data that is collected may be in common to all the IT elements such as the information that is exposed to the IT element, or the data may be unique and specific to each IT element, for example: if the IT element is a user—the age of the user is relevant, however if the IT element is a server than the age is not relevant but the volume of data traffic is relevant. The present invention automatically collects the relevant data for each IT element and derives the misuseability score accordingly.

The misuseability score is derived by applying a predefined function on a set of relevant parameters that are calculated from the collected data. Thus, given a set of parameters, p1, p2, . . . , pn that are dynamically computed from the data that is collected from the IT element, the misuseability score of the IT element can be computed, for example, according to the following equation:

$$MScore(e, c) = \sum_{i=1}^{n} \alpha_i \cdot p_i$$

where $\alpha_1, \alpha_2, \ldots, \alpha_n$ are constants which define the importance of each parameter pi. These constants should be provided by the security officer or derived automatically. Mscore(e,c) is the misuseability score, c in the equation refers to the specific context for which the misuseability score is computed, and e in the equation refers to the IT element for which the misuseability score is calculated for. For example, the context can be determined by the day of week and part of day for which the misuseability score is derived. In addition, $\alpha_i$ may be different for different context.

A set of possible misuseability measures are presented:

1. Router M-Score (RM-Score)

A router misuseability score depends on the amount and quality of information that is handled by the router as well as on the activation of various capabilities of the router. For example, potentially, the more data that is handled by the router the higher the misuseability score. Data that is sent from/to a sensitive machine (e.g., a machine with a high misuseability score) via the router increase the misuseability score of the router. In addition, a specific capability that is activated on the router (e.g., a VPN, WAN) increases the attractiveness of the router and the potential misuseability. In addition, the type and version of the router may influence the misuseability score because old/outdated operating system or firmware may result in a more vulnerable device.

Therefore the RM-Score is derived from the following parameters:

Configuration: Vendor, Operating System (OS) type, OS version, Known vulnerabilities, Activated functionalities (e.g., segmentation, tunneling/encryption, quality of service)

Purpose: Location (gateway or internal), Importance of connecting networks, Sensitivity level of IP addresses (for example, according to the computed misuseability score of the IP address)

Activity: Amount of data transmitted, Number of distinct IP addresses, Percentage of encrypted traffic 2. Server M-Score (SM-Score)

A server misuseability score depends on the volume of the activity of the server, the number of connected users, the type and importance of the services that are provided by the server and the properties of the server such as the type and version of the operating system and open ports and running services.

Therefore, the SM-Score is derived from the following parameters:

Configuration: OS type, OS version, Known vulnerabilities, Number and type of open ports, Running services, Number of users including administrators Server purpose: Importance of the service provided by the server, Misuseability score of the connected hosts (HM-Score), Location of server (e.g., internal, DMZ)

Activity: Number of hosts served by the server, Volume of activity, Volume and type of network traffic;

3. Host M-Score (HM-Score)

The Host M-Score is computed for each end-user device which may include personal computers, laptops and smartphones.

Similar to a sever misuseability score the host misuseability score depends on the volume of the activity, the number of users, the type and importance of the services that are used and the properties of the host such as the type of the device, type and version of the operating system and open ports, running services, and used services such as secured remote connection.

The host misuseability score may be derived from the following parameters:

Configuration: Host type, OS type, OS version, Known vulnerabilities, Number and type of open ports, Running services, Number of users including administrators;

Server purpose: Importance of the service provided by the server, Misuseability score of the users (UM-Score), Location of host;

Activity: Running applications and services, Number of users using the host machine, Volume of activity, Volume and type of network traffic, Connected networks (both wired and wireless);

4. Tabular Data M-Score (DM-Score)

The DM-Score measure [disclosed at Harel, A., Shabtai, A., Rokach, L., and Elovici, Y., 2012. M-score: A misuseability weight measure. IEEE Trans. on Dependable and Secure Computing, 9 (3), 2012, 414-428] estimates the extent of damage that can be caused by an insider that is continuously and gradually exposed to tabular data; i.e., datasets (e.g., result sets of relational database queries). The DM-Score is mainly influenced by the number of entities exposed to the insider (i.e., number of records), the number of properties available on each entity (i.e., number of attributes), the value of properties, and the anonymity level which is regarded as the effort that is required in order to fully identify a specific entity in the data.

5. Textual M-Score (TM-Score)

The TM-Score measure [disclosed in Shabtai, A., Vartanian, A., 2014. TM-Score: A Misuseability Weight Measure for Textual Content", submitted to IEEE Trans. on Information Forensics and Security] estimates the extent of damage that can be caused by an insider that is continuously and gradually exposed to documents. The extent of damage is determined by the amount, type and quality of information to which the insider is exposed. This is done by deriving an accumulated TM-Score each time that the user is exposed to a document (e.g., opening a file, printing a file, copying a file to a storage device). The TM-Score is accumulated in the sense that it considers the documents that the insider was exposed to in the past as well as the recently exposed document. The main challenge in deriving the accumulated TM-Score is the identification of the residual information in the recently exposed document (i.e., identifying exactly what is the true new information in the document with relation to the previously exposed documents) and its contribution to the accumulated TM-Score. It can be said that the TM Score is an extension the DM Score.

6. User M-Score (UM-Score)

In general, the user M-Score is derived from the type of services and machines that the user accesses as well the type of data and information that the user is exposed to. It can also be derived from general behavioral patterns of the user (e.g., a salesperson who travels a lot and connects to many WiFi networks). Therefore, the UM-Score is computed from the following parameters:

Demographic features: Age, Role in the organization, Seniority

Activity: Number of systems and services that the user accesses and the misuseability score of such systems, Volume of activity (i.e., how often the user access the systems and services), Volume and type of generated network traffic (e.g., encrypted traffic), Connected networks (both wired and wireless)

Sensitivity of data: User's derived DM-Score, User's derived TM-Score

Figure 2:
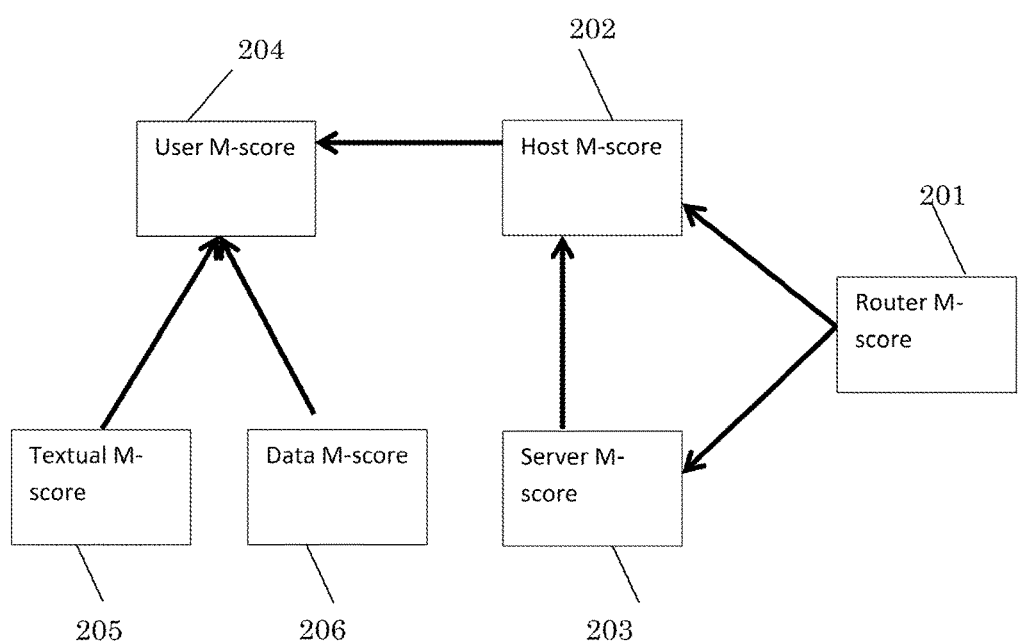
FIG. 2 schematically summarizes the connections among the misuseability scores of the various IT components and presents the derivation tree of misuseability scores.

FIG. 2 summarizes the connections among the misuseability scores of the various IT components and presents the derivation tree of misuseability scores. It can be seen that the Router misuseability score 201 (Mscore) affects the Host Mscore 202, and the server Mscore 203. The server Mscore 203 affects the host Mscore 202 and the host Mscore 202 affects the User Mscore 204 as well as the data Mscore 206 and the Textual Mscore 205 affects the user Mscore 204.

As illustrated by FIG. 1, the IT infrastructure of an organization can be represented as a graph. The nodes of the graph indicate an IT element and are assigned with attributes such as type of IT element and its computed misuseability score. The links may indicate the strength of the connection between elements. The strength of the connection between elements can be derived for example, from the amount of traffic or activity between two elements (e.g., a server and a router, or a PC and a server) and from the rate of activity and connection between the two elements.

Given such a graph, various graph clustering and community detection algorithms may be applied in order to identify clusters of IT elements that as a group are highly connected and highly misuseable. Note that each individual element in the identified group not necessarily have the highest misuseability score. The security officer of the organization should focus on those highly misuseable sets and increase their protection, for example by raising the awareness of the users, adding monitoring security measures and lowering the thresholds of existing security measures (although it may come on the account of a higher false positive rate).

In addition, an anomaly detection can be applied on the misuseability score of each IT element. An anomaly detection process can be applied in order to learn, for each context, the acceptable misuseability score of the IT element and identify significant deviations from the misuseability level. For example, when the tunneling functionality of a router is disabled, the misuseability score of the router should be reduced significantly, a fact that should raise an alert to the security officer.

The invention claimed is:

1. A method for automatically and dynamically deriving a misuseability score for a plurality of computerized IT elements being connected to a data network including a router, a network server, and one or more hosts, comprising the following steps performed by a monitoring server which is also connected to said data network in addition to said plurality of computerized IT elements:
   a) automatically collecting vulnerability affecting data, including data exchange rate, about each of said plurality of IT elements;
   b) analyzing said collected data in terms of connectivity level and sensitivity level;
   c) deriving from said analyzed data a misuseability score for each of said plurality of IT elements based on at least said sensitivity level;
   d) dynamically grouping together IT elements that are networked together by a relatively high connectivity level to define a group, wherein said relatively high connectivity level is greater than the connectivity level of any other group of IT elements selected from said plurality of IT elements, excluding the IT elements forming said defined group;
   e) based on said relatively high connectivity level, dynamically deriving an aggregative misuseability score for said defined group; and
   f) automatically adding security measures to the IT elements of said defined group when the aggregative misuseability score is higher than a threshold.

2. The method according to claim 1, wherein each of the IT elements is selected from the group consisting of a PC, laptop, server, router, smartphone, database, switch and a terminal device of a user.

3. The method according to claim 1, wherein each of the IT elements is an element which is connected to an organization network and/or to the internet.

4. The method according to claim 1, wherein the aggregative misuseability score is derived according to:

$$MScore(e, c) = \sum_{i=1}^{n} \alpha_i \cdot p_i$$

wherein,
   $p_i$ are parameters that are dynamically computed from the collected data;
   $\alpha_i$ are constants which define the importance of each parameter;
   Mscore(e,c) is the misuseability score;
   c is the specific context for which the misuseability score is computed; and
   e is the IT element for which the misuseability score is calculated.

5. The method according to claim 1, wherein the aggregative misuseability score for the defined group is based on an interrelation between the misuseability score of at least a router misuseability score, a network server misuseability score, and a host misuseability score.

6. The method according to claim 5, wherein the network server misuseability score is derived from the parameters of: configuration, server purpose and activity.

7. The method according to claim 5, wherein the host misuseability score is derived from the parameters of: configuration, purpose and activity.

8. The method according to claim 5, wherein the aggregative misuseability score is also based on an interrelation between the host misuseability score and a user misuseability score which is derived from the type of services and machines that the user accesses as well as the type of data and information to which the user is exposed.

9. The method according to claim 8, wherein the user misuseability score is derived from general behavioral patterns of the user.

10. The method according to claim 1, wherein the connectivity level between the two or more IT elements is derived from an amount of traffic or activity between the two or more elements and from the rate of activity and connection between the two or more elements.

11. The method according to claim 5, wherein the router misuseability score is derived from the parameters of: configuration, purpose and activity.

* * * * *